March 21, 1967 P. S. SWARTZ ETAL 3,310,395
SUPERCONDUCTORS CONTAINING A FISSIONABLE METAL OR BORON IMPURITY
Filed Aug. 27, 1964
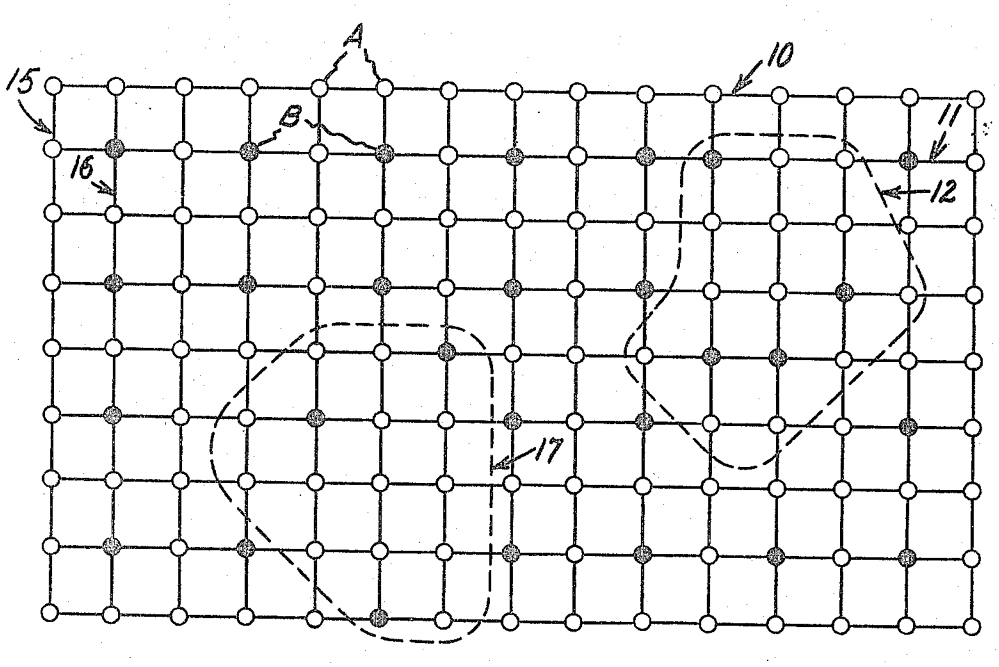
Inventors:
Paul S. Swartz,
Robert L. Fleischer,
by Richard A. Speer
Their Attorney.

3,310,395

SUPERCONDUCTORS CONTAINING A FISSIONABLE METAL OR BORON IMPURITY

Paul S. Swartz and Robert L. Fleischer, Schenectady, N.Y., assignors to General Electric Company, a corporation of New York Filed Aug. 27, 1964, Ser. No. 392,542
8 Claims. (Cl. 75—122.5)

This invention relates to superconductive materials and more particularly to superconductive metal alloys of the substitutional type which have been doped with impurities and irradiated to improve their superconductive properties, especially the critical current density.

While the existence of superconductivity in many metals, metal alloys and metal compounds has been known for many years, the phenomenon has been more or less treated as a scientific curiosity until comparatively recent times. The awakened interest in superconductivity may be attributed, at least in part, to technological advances in the arts where their properties would be extremely advantageous and to advances in cryogenics which removed many of the economic and scientific problems involved in extremely low temperature operations.

As is well known, "superconduction" is a term describing the type of electrical current conduction existing in certain materials cooled below a critical temperature, $T_c$, where resistance to the flow of current is essentially nonexistent. Like a normally conductive material, a superconductive material, that is, any material having a critical temperature $T_c$ below which normal resistance to the flow of electrical current is absent, can be subjected to an applied magnetic field when cooled below $T_c$ and a current will be induced therein. The current in the superconductive material, however, even with the removal of the applied magnetic field, will theoretically continue for an infinite time and is therefore called "supercurrent" to distinguish it from the usual current present at temperatures above the critical temperature $T_c$. But, supercurrents will exist in those materials classified as "soft" superconductors only if a geometry is provided which has a multiply-connected surface as opposed to a simply-connected surface, and the applied magnetic field is below a critical magnetic field, $H_c$. A solid cylinder is an example of a simply-connected body, and a cylinder having an axial bore or a hollow sphere are examples of multiply-connected bodies. In the case of hard superconductors, supercurrents will exist without regard to the geometry of the body, since they are inherently multiply-connected. Here, assuming the low temperature requirement which is present in all cases, the applied magnetic field need only be below the critical field $H_c$.

The terms "hard" and "soft," as applied to superconductors, originally refer principally to these physical properties of the materials. Subsequently however, the terms have ordinarily been used when referred to the magnetic properties, although there is often a correlation between the physical and magnetic hardness and softness. As a general matter, it may now be assumed that a hard superconductive body is one wherein, either by virtue of composition or geometry, or both, the application of a subcritical magnetic field to it at temperatures below $T_c$ will result in magnetic flux being "trapped," that is, remaining even after the applied magnetic field has been removed. This so-called trapped flux actually derives from sustaining supercurrents created in the superconductive body by the applied magnetic field. Thus, a hard superconductive body is one in which irreversible magnetic effects are present. Stated slightly differently, a hard superconductive body will evidence magnetic hysteresis when subjected to a cyclically-reversed applied magnetic field.

It is a principal object of this invention to provide a superconductive metal alloy of the substitutional type which contains an impurity and which has enhanced superconductive characteristics.

Another object of this invention is to provide a superconductive metal alloy of the substitutional type which is initially atomically ordered but which contains regions of atomic disorder.

A further object of this invention is to provide a process for treating doped superconductive metal alloys of the substitutional type to enhance the superconductive characteristics thereof.

Other objects and advantages of this invention will be in part obvious and in part explained by reference to the accompanying specification and drawings.

In the drawings, the figure is a schematic drawing of the atomic arrangement on one plane of a crystal of a material according to this invention which has regions of disorder within an ordered matrix.

Very broadly, the present invention is concerned with superconductive metal alloys of the substitutional type which contain an impurity, and which are atomically partially disordered and which have improved superconductive properties, notably increased current carrying capacities. Additionally, this invention concerns a process for irradiating specific types of doped superconductive alloys to increase their critical or superconducting current carrying capacities.

Considering the invention more specifically, the basic superconductive alloys of this invention must be of the substitutional solid solution type, as opposed to the interstitial type of solid solution, in which the solute atoms are substituted for solvent atoms on the crystal lattice of the latter. Further, while in the normal substitutional solid solutions, the solute atoms replace solvent atoms randomly in the crystal lattice, the starting alloys of this invention must be atomically ordered. That is, each atom type considered by itself is located in regular positions on the lattice. Thus, those alloys designated in the art as "intermetallic compounds" are contemplated within the scope of this invention. Such atomically ordered alloys are commonly referred to as "super-lattice structures."

The figure of the drawings illustrates schematically the atomic structure of the basic superconductive alloys of this invention. Assume for discussion that the metallic solution involved has the formula $A_3B$ (which could actually be the compound $Nb_3Al$, for example) with A representing the white atoms and B representing the black atoms. It will be seen that the atoms A are arranged in order along the crystallographic row 10 and also that atoms A and B alternate in an ordered manner in the crystallographic row 11 with the exception of an area of atomic disorder outlined by the dotted line 12. Similarly, the vertical rows of atoms, for example 15 and 16, also show an ordered atomic arrangement. This is the type of ordered material which is necessary initially in the present invention so that regions of disorder such as those contained within the dotted lines 12 and 17 can be created. Such regions of disorder can be identified by means of X-ray photographs.

Thus, the superconductive bodies of this invention must initially—that is, prior to being treated in the manner later described—be atomically ordered, it having been found that superconductive materials which are inherently atomically disordered cannot have their superconductive properties altered in the manner described here.

Having a suitably ordered superconductive alloy, additions of impurities are then made. Such additions can be made in amounts up to the solid solubility limit of the doping impurity in the basic superconductive alloy, although lesser amounts would normally be used. Specifically, the additions usually will not exceed about 20 atomic percent and additions of up to about 10 atomic percent would be most prevalent. The doping additions are made to the basic alloy by casting and alloying procedures common to the metallurgical field.

The purpose of introducing doping reagents to the superconductive alloys is to enable the production of relatively large, discrete regions of radiation damage as a result of motion of the energetic charged particles created within the material. The procedure is one wherein alteration of the impurities is induced by subjecting the material to a radiation dose of not less than about $1\times10^{17}$ thermal neutrons per square centimeter (*nvt*) for natural uranium or at least $1\times10^{15}$ for enriched uranium or boron. This irradiation improves the critical carrying capacity of the superconductive metal alloy by causing the exchange of atoms between sites on the crystal lattices, this exchange resulting from the motion of the energetic charged particles referred to previously.

Bodies were produced by subjecting various ordered metal alloys to different radiation doses of thermal neutrons and alloying with these metals a small amount of boron or natural uranium. More specifically, six small ingots were produced by arc-casting. Three $Nb_3Al$ ingots and three $V_3Si$ ingots were produced and of these, one of each composition was made without the addition of any impurity. In the two remaining $Nb_3Al$ ingots, 0.031 atomic percent boron was added to one ingot and 0.321 atomic percent uranium was added to the other. Similarly, 0.178 atomic percent boron was added to one of the $V_3Si$ ingots and 0.190 atomic percent uranium was added to the other. The ingots were then crushed to powder and sized and powder from each 70 micron diameter population was irradiated with doses ranging from about $1.1\times10^{17}$ to $1.7\times10^{18}$ thermal neutrons per square centimeter.

The following table indicates the changes in current density which were effected by the thermal irradiation:

| Material | $1.12\times10^{17}$, Thermal N./cm.$^2$ | | $1.66\times10^{18}$, Thermal N./cm.$^2$ | |
|---|---|---|---|---|
| | $\Delta J_c{}^*\times10^{-5}$ at H=4,000 oe. | $\Delta J_c\times10^{-5}$ at H=30,000 oe. | $\Delta J_c\times, 0^{-5}$ at H=4,000 oe. | $\Delta J_c\times10^{-5}$ at H=30,000 oe. |
| $V_3Si$ | ---------- | ---------- | 2 | .15 |
| $V_3Si$+.178 a/o B | ---------- | ---------- | 2 | .5 |
| $V_3Si$+.190 a/o U | 7 | .35 | 32 | 16 |
| $Nb_3Al$+.321 a/o U | 3.4 | .5 | ---------- | ---------- |

*$\Delta J_c$=Change in critical current density in units of $10^5$ amps./cm.$^2$ The critical current density of $V_3Si$ containing 0.190 atomic percent uranium is increased from its low, non-irradiated value ($\sim3\times10^5$ amps/cm.$^2$ at 4000 oe. and $\sim0.25\times10^5$ amps/cm.$^2$ at 30,000 oe.) by $32\times10^5$ amps/cm.$^2$ in a magnetic field of 4000 oe. and $16\times10^5$ amps/cm.$^2$ at 30,000 oe. These values of critical current density are the highest yet reported for any high-field superconductor. It is also important to note that although the $V_3Si$ contained 0.190 atomic percent uranium (1 in 525 atoms), only one atom in every 140 of these is $U^{235}$. Furthermore, at the high neutron dose level ($1.7\times10^{18}$), only one out of every 1025 $U^{235}$ atoms is fissioned. The net result is that these very large increases in critical current density have been accomplished by the fission of only one atom in about 75 million.

The critical current density is not a simple linear function of neutron dose for the uranium-doped $V_3Si$. When the neutron dose is increased a factor of 15 ($1.7\times10^{18}/1.1\times10^{17}$), the critical current density is increased only by a factor of about 3.5 (35/10) in a magnetic field of 4000 oe., but is increased by a factor of about 27 (16/0.6) at 30,000 oe. These results are contrary to those obtained when undoped intermetallics are subjected to fast neutron irradiation.

The critical current density falls off more slowly with increasing magnetic field when the magnitude of the critical current density is large. The critical current density of the uranium-doped $V_3Si$ subjected to the high neutron dose decreases a factor of two between 4000 and 30,000 oe., while the current density of each of the other materials reported drops by a factor of roughly 10.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What we claim as new and desire to secure by Letters Patent of the United States is:

1. An article of manufacture comprising a body composed of a superconductive metal alloy of the substitutional type containing a fissionable or boron impurity in amounts not exceeding the solubility limit of the impurity in the alloy, said body having partial disordering of the atomic structure.

2. An article as defined in claim 1 wherein the impurity is selected from the group consisting of natural uranium, enriched uranium and boron.

3. An article as defined in claim 1 wherein the impurity is present in amounts up to about 20 atomic percent.

4. A process for increasing the superconducting current density of atomically ordered superconductive metal alloy of the substitutional type containing a fissionable or boron impurity in amounts not exceeding the solid solubility limit of the impurity in the alloy, said process comprising subjecting the alloys to a radiation dose of not less than about $1\times10^{15}$ thermal neutrons to effect partial disordering of the atomic structure of the alloys and thereby increase the size of the superconducting current densities.

5. An article as defined in claim 1 wherein said superconductive metal alloy is $Nb_3Sn$.

6. An article as defined in claim 1 wherein said superconductive metal alloy is $V_3Ga$.

7. An article as defined in claim 1 wherein said superconductive metal alloy is $Nb_3Al$.

8. An article as defined in claim 1 wherein said superconductive metal alloy is $V_3Si$.

References Cited by the Examiner

UNITED STATES PATENTS 3,215,569 11/1965 Kneip et al. ---------- 148—133

OTHER REFERENCES

Applied Physics Letters, vol. 4, 1964, pp. 43–45, 71–73, and 147–149.

CARL D. QUARFORTH, *Primary Examiner.*

BENJAMIN R. PADGETT, *Examiner.*

M. J. SCOLNICK, *Assistant Examiner.*